US009080642B2

(12) United States Patent
Ushiroda et al.

(10) Patent No.: US 9,080,642 B2
(45) Date of Patent: Jul. 14, 2015

(54) TRANSMISSION

(75) Inventors: Yuichi Ushiroda, Okazaki (JP); Takuya Yamamura, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 14/128,985

(22) PCT Filed: May 29, 2012

(86) PCT No.: PCT/JP2012/063745
§ 371 (c)(1),
(2), (4) Date: Dec. 23, 2013

(87) PCT Pub. No.: WO2013/008544
PCT Pub. Date: Jan. 17, 2013

(65) Prior Publication Data
US 2014/0130626 A1    May 15, 2014

(30) Foreign Application Priority Data

Jul. 8, 2011   (JP) ................... 2011-151889

(51) Int. Cl.
*F16H 3/08* (2006.01)
*F16H 3/00* (2006.01)

(52) U.S. Cl.
CPC .............. *F16H 3/08* (2013.01); *F16H 3/006* (2013.01); *F16H 2200/0004* (2013.01); *F16H 2200/0052* (2013.01); *Y10T 74/19284* (2015.01)

(58) Field of Classification Search
CPC ............... Y10T 74/19284; Y10T 74/19288; Y10T 74/19293; F16H 2200/0004; F16H 2200/0052; F16H 2200/0064; F16H 3/08; F16H 3/006

USPC ................................................... 74/339, 340
See application file for complete search history.

(56) References Cited

U.S. PATENT DOCUMENTS

| 5,720,203 | A | 2/1998 | Honda et al. | |
|---|---|---|---|---|
| 6,715,597 | B1 * | 4/2004 | Buchanan et al. | 192/70.12 |
| 6,790,159 | B1 * | 9/2004 | Buchanan et al. | 477/86 |
| 6,819,997 | B2 * | 11/2004 | Buchanan et al. | 701/67 |
| 6,832,978 | B2 * | 12/2004 | Buchanan et al. | 477/174 |
| 6,883,394 | B2 * | 4/2005 | Koenig et al. | 74/335 |
| 6,898,992 | B2 * | 5/2005 | Koenig et al. | 74/335 |

(Continued)

FOREIGN PATENT DOCUMENTS

| JP | 9-42387 A | 2/1997 |
|---|---|---|
| JP | 11-51126 A | 2/1999 |

(Continued)

*Primary Examiner* — William Kelleher
*Assistant Examiner* — Valentin Craciun
(74) *Attorney, Agent, or Firm* — Birch, Stewart, Kolasch & Birch, LLP

(57) ABSTRACT

A reversing gear (13*d*) is disposed between a fifth fixed gear (13*a*) having a smallest outer diameter among respective gears provided in a first main shaft (4) and a second main shaft (5) and a sixth idling gear (13*b*) having a smallest outer diameter among respective gears provided in a first sub-shaft (6) to always mesh with the respective gears. A first synchronizing sleeve (21) is disposed to overlap a bearing (8*a*) of a third sub-shaft (8) in the axial direction of the second main shaft (5). A second synchronizing sleeve (22), a third synchronizing sleeve (23), and a fourth synchronizing sleeve (24) are disposed to overlap a bearing (8*b*) of the third sub-shaft (8) in the axial direction of the second main shaft (5).

3 Claims, 5 Drawing Sheets

(56) References Cited

U.S. PATENT DOCUMENTS

| | | | |
|---|---|---|---|
| 6,953,417 B2 * | 10/2005 | Koenig | 477/181 |
| 7,073,407 B2 * | 7/2006 | Stefina | 74/331 |
| 7,127,961 B2 * | 10/2006 | Braford et al. | 74/340 |
| 7,155,993 B2 * | 1/2007 | Koenig et al. | 74/331 |
| 7,219,571 B2 * | 5/2007 | McCrary | 74/335 |
| 7,677,378 B2 * | 3/2010 | Shintani | 192/219.5 |
| 7,856,999 B2 * | 12/2010 | Xiang et al. | 137/118.02 |
| 8,376,906 B2 * | 2/2013 | Koenig et al. | 477/5 |
| 8,578,764 B2 * | 11/2013 | Stefina | 73/115.02 |
| 8,800,399 B2 * | 8/2014 | Mills | 74/335 |
| 2009/0173175 A1 | 7/2009 | Thery | |
| 2009/0223317 A1 * | 9/2009 | Annear | 74/473.24 |
| 2012/0247903 A1 * | 10/2012 | Pritchard | 192/48.1 |
| 2013/0112030 A1 * | 5/2013 | Feldt et al. | 74/473.11 |

FOREIGN PATENT DOCUMENTS

| | | |
|---|---|---|
| JP | 2003-120764 A | 4/2003 |
| JP | 2008-540970 A | 11/2008 |
| JP | 2010-236590 A | 10/2010 |
| JP | 2011-33045 A | 2/2011 |

* cited by examiner

| GEAR POSITION | K1 | K2 | A | B | C | D | E | F |
|---|---|---|---|---|---|---|---|---|
| REVERSE | ● | | | ● | | ● | | ● |
| FIRST GEAR | ● | | | ● | | ● | ● | |
| SECOND GEAR | | ● | ▽ | ● | | △ | ● | |
| THIRD GEAR | ● | | ● | △ | | ▽ | ● | |
| FOURTH GEAR | | ● | ● | | ▽ | ● | △ | |
| FIFTH GEAR | ● | | △ | | ● | ● | ▽ | |
| SIXTH GEAR | | ● | | | ● | ● | ● | |

TRANSMISSION

TECHNICAL FIELD

The present invention relates to a mechanical automatic transmission.

BACKGROUND ART

As a transmission of a vehicle, a mechanical automatic transmission in which a torque converter is not used is known. In the mechanical automatic transmission, operation (select and shift) of a gearbox and disconnection and connection of a clutch in a manual transmission are actuated by an actuator to enable automatic gear shifting that does not require a torque converter. In the transmission, for example, as described in Patent Literature 1, a gear group fixedly provided in a first or a second input shaft coaxial with a crankshaft of an engine and a gear group supported by a sub-shaft or an output shaft and connected to the respective shafts by a meshing clutch mechanism are meshed with each other, a driving force input from the engine is shifted, and the shifted driving force is output from the output shaft.

CITATION LIST

Patent Literature

Patent Literature 1: Japanese Patent Laid-Open No. 2003-120764

SUMMARY OF INVENTION

Technical Problem

In the transmission of Patent Literature 1, a reversing gear is provided between the gear fixedly provided in the second input shaft and the gear relatively rotatably supported by the sub-shaft.

However, it is not preferable to provide the reversing gear between the gear fixedly provided in the second input shaft and the gear having a larger outer diameter relatively rotatably supported by the sub-shaft because the transmission is increased in size in the radial direction with respect to the input shaft, i.e., the width of the transmission increases, leading to deterioration in mountability on a vehicle.

The present invention has been devised to solve such a problem and it is an object of the present invention to provide a transmission that has high vehicle mountability even if a reversing gear is provided between an input shaft and a sub-shaft.

Solution to Problem

In order to attain the object, a transmission according to the present invention includes: a main input shaft to which a driving force from an internal combustion engine is input; a first main shaft to which the driving force of the main input shaft is selectively transmitted via a first clutch; a second main shaft arranged coaxially with the first main shaft, the driving force of the main input shaft being selectively transmitted to the second main shaft via a second clutch; a first sub-shaft, a second sub-shaft, and a third sub-shaft arranged in parallel to the first main shaft and the second main shaft; gear groups respectively provided in the first main shaft and the second main shaft; a gear group provided in the first sub-shaft; and a first fixed gear provided in the second sub-shaft and configured to output the driving force, the transmission including a reversing gear fixedly provided in the third sub-shaft, wherein the reversing gear is arranged between a gear having a smallest outer diameter in the gear groups provided in the first main shaft and the second main shaft and a gear having a smallest outer diameter in the gear group provided in the first sub-shaft to mesh with the respective gears (Claim 1).

It is preferable that the transmission includes: a first idling gear relatively rotatably supported by the second sub-shaft and configured to transmit the driving force of the first main shaft; a second idling gear relatively rotatably supported by the second sub-shaft and configured to transmit the driving force of the second main shaft; and a first synchronization mechanism provided in the second sub-shaft and configured to selectively transmit the driving force of the first idling gear or the driving force of the second idling gear to the second sub-shaft, and both ends of the third sub-shaft are rotatably supported by bearings, and one bearing of the third sub-shaft is disposed to overlap the first synchronization mechanism in the axial direction of the second main shaft (Claim 2).

It is preferable that the transmission includes: a second synchronization mechanism configured to connect a third idling gear and the second main shaft, the third idling gear being relatively rotatably supported by the second main shaft and configured to transmit the driving force to the first sub-shaft and the second sub-shaft; a third synchronization mechanism configured to connect a fourth idling gear and the first sub-shaft, the fourth idling gear being relatively rotatably supported by the first sub-shaft; and a fourth synchronization mechanism configured to connect a fifth idling gear and the second sub-shaft, the fifth idling gear being relatively rotatably supported by the second sub-shaft, and the other bearing of the third sub-shaft is disposed to overlap the second synchronization mechanism, the third synchronization mechanism, and the fourth synchronization mechanism in the axial direction of the second main shaft (Claim 3).

It is preferable that the transmission includes: a second synchronization mechanism configured to connect a third idling gear and the second main shaft, the third idling gear being relatively rotatably supported by the second main shaft and configured to transmit the driving force to the first sub-shaft and the second sub-shaft; a third synchronization mechanism configured to connect a fourth idling gear and the first sub-shaft, the fourth idling gear being relatively rotatably supported by the first sub-shaft; and a fourth synchronization mechanism configured to connect a fifth idling gear and the second sub-shaft, the fifth idling gear being relatively rotatably supported by the second sub-shaft, and both ends of the third sub-shaft are rotatably supported by bearings, the other bearing of the third sub-shaft opposed to one bearing of the third sub-shaft is disposed to overlap the second synchronization mechanism, the third synchronization mechanism, and the fourth synchronization mechanism in the axial direction of the second main shaft (Claim 4).

Advantageous Effects of Invention

With the transmission according to the present invention, the reversing gear is arranged between the gear having the smallest outer diameter in the gear groups provided in the first main shaft and the second main shaft and the gear having the smallest outer diameter in the gear group provided in the first sub-shaft to mesh with the respective gears. It is possible to suppress the transmission from being expanded in the radial direction of the second main shaft by the addition of the reversing gear and make the transmission compact. Therefore, it is possible to improve vehicle mountability (Claim 1).

One bearing of the bearings that support the third sub-shaft is disposed to overlap the first synchronization mechanism in the axial direction of the second main shaft. Consequently, it is possible to reduce the length in the axial direction of the transmission with respect to the second main shaft and make the transmission compact. Therefore, it is possible to further improve the vehicle mountability (Claim 2).

The other bearing of the bearings that support the third sub-shaft is disposed to overlap the second synchronization mechanism, the third synchronization mechanism, and the fourth synchronization mechanism in the axial direction of the second main shaft. Consequently, it is possible to further reduce the length in the axial direction of the transmission with respect to the second main shaft and make the transmission more compact. Therefore, it is possible to improve the vehicle mountability (Claim 3).

Further, the other bearing of the bearings that support the third sub-shaft is disposed to overlap the second synchronization mechanism, the third synchronization mechanism, and the fourth synchronization mechanism in the axial direction of the second main shaft. Consequently, it is possible to further reduce the length in the axial direction of the transmission with respect to the second main shaft and make the transmission more compact.

Therefore, it is possible to improve the vehicle mountability (Claim 4).

DESCRIPTION OF EMBODIMENTS

Embodiments of the present invention are explained below on the basis of the drawings.

Figure 1:
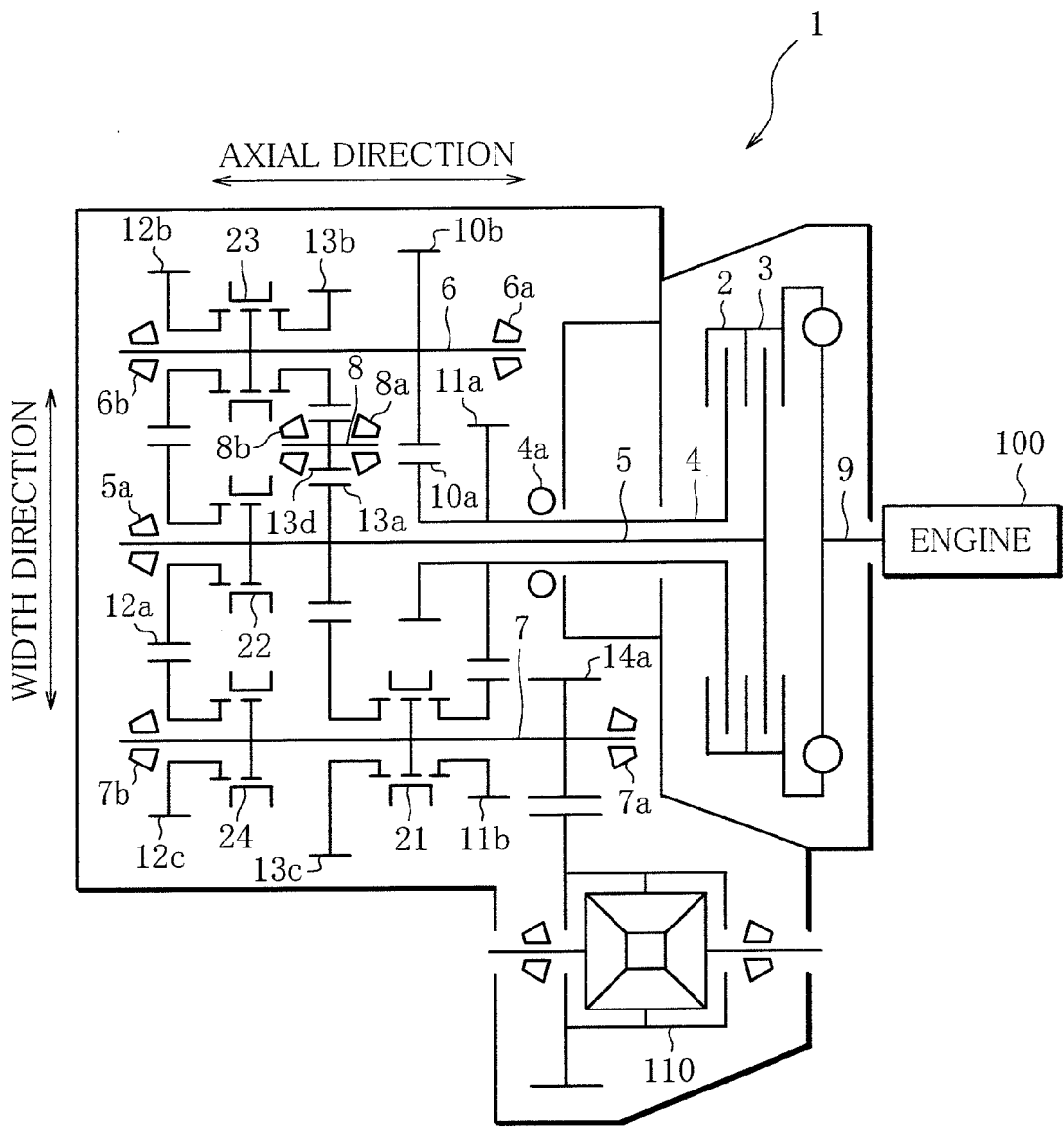
FIG. 1 is a schematic configuration diagram of a transmission according to the present invention.
Figure 2:
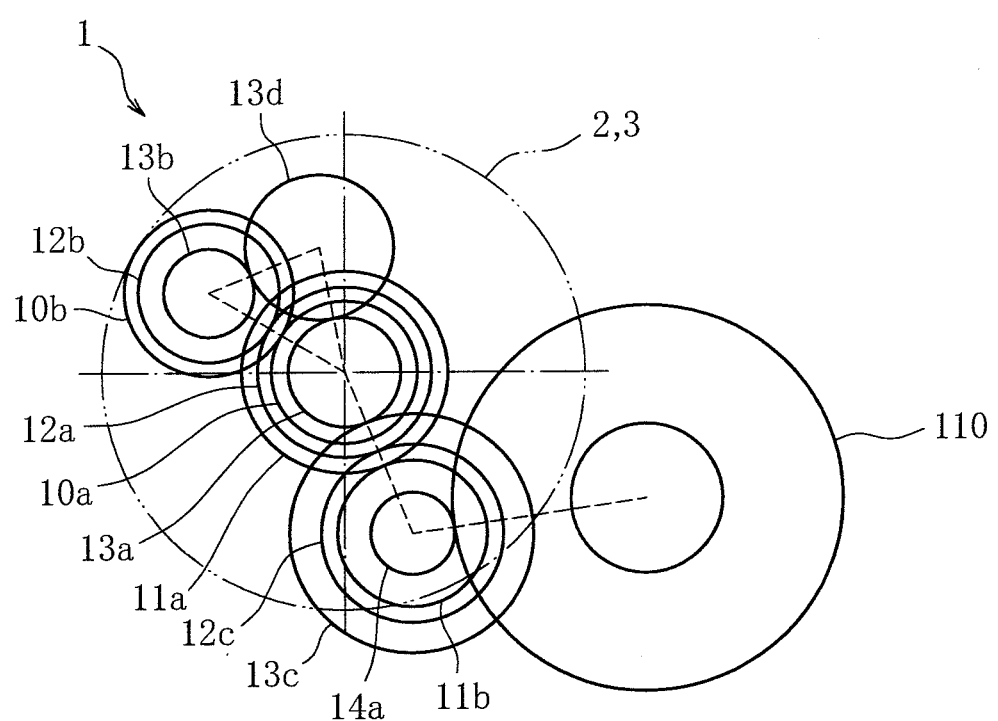
FIG. 2 is an axial direction view showing positional relations among respective shafts of the transmission according to the present invention.

FIG. 1 is a schematic configuration diagram of a transmission according to the present invention. Note that the left-right direction in the figure is the axial direction of the transmission and the up-down direction in the figure is the width direction of the transmission. FIG. 2 is an axial direction view showing a positional relation among respective shafts of the transmission. The configuration of the transmission according to the present invention is explained below.

As shown in FIGS. 1 and 2, a gearbox unit 1 includes two clutches 2 and 3, two main shafts 4 and 5 arranged coaxially, and three sub-shafts 6, 7, and 8. The first main shaft 4 is configured such that power is transmitted from an output shaft (a main input shaft) 9 of an engine (an internal combustion engine) 100 to the first main shaft 4 via the first clutch 2. The second main shaft 5 is configured such that power is transmitted from the output shaft 9 to the second main shaft 5 via the second clutch 3. The first main shaft 4 and the second main shaft 5 are rotatably supported by bearings 4a and 5a in the middle of the first main shaft and at an end of the second main shaft.

The first sub-shaft 6, the second sub-shaft 7, and the third sub-shaft 8 are arranged apart from one another such that the axes thereof are parallel to the axes of the first main shaft 4 and the second main shaft 5. The second sub-shaft 7 is configured to be capable of transmitting power to a differential gear 110 in a later gear position of the gearbox unit 1 via a first fixed gear 14a described later. The first sub-shaft 6 is rotatably supported at both ends of the first sub-shaft 6 by the respective bearings 6a and 6b. The second sub-shaft 7 is rotatably supported at both ends of the second sub-shaft 7 by the respective bearings 7a and 7b. The third sub-shaft 8 is rotatably supported at both ends of the third sub-shaft 8 by the respective bearings 8a and 8b.

A second fixed gear 10a and a fourth fixed gear 11a are fixed to the first main shaft 4 in order from the opposite side of the output shaft 9 to integrally rotate with the first main shaft 4. The fourth fixed gear 11a is formed with an outer diameter larger than the outer diameter of the second fixed gear 10a. In the second main shaft 5, a third idling gear 12a and a fifth fixed gear 13a are provided in order from the opposite side of the output shaft 9. The third idling gear 12a is formed with an outer diameter larger than the outer diameter of the second fixed gear 10a and smaller than the outer diameter of the fourth fixed gear 11a. The third idling gear 12a is pivotally supported to be relatively rotatable with respect to the second main shaft 5. The fifth fixed gear 13a is formed with an outer diameter smaller than the outer diameter of the second fixed gear 10a. That is, the fifth fixed gear 13a is formed with a smallest outer diameter among the respective gears provided in the first main shaft 4 and the second main shaft 5. The fifth fixed gear 13a is fixed to integrally rotate with the second main shaft 5.

In the first sub-shaft 6, a fourth idling gear 12b, a sixth idling gear 13b, and a third fixed gear 10b are provided in order from the opposite side of the output shaft 9. The third fixed gear 10b is formed with an outer diameter larger than the outer diameter of the fourth idling gear 12b. The third fixed gear 10b is fixed to integrally rotate with the first sub-shaft 6. The fourth idling gear 12b is formed with an outer diameter larger than the outer diameter of the sixth idling gear 13b. That is, the sixth idling gear 13b is formed with a smallest outer diameter among the respective gears provided in the first sub-shaft 6. The fourth idling gear 12b and the sixth idling gear 13b are pivotally supported to be relatively rotatable with respect to the first sub-shaft 6.

In the second sub-shaft 7, a fifth idling gear 12c, a second idling gear 13c, a first idling gear 11b, and a first fixed gear 14a are provided in order from the opposite side of the output shaft 9. The second idling gear 13c is formed with an outer diameter larger than the outer diameter of the fifth idling gear 12c. The first idling gear 11b is formed with an outer diameter smaller than the outer diameter of the fifth idling gear 12c. The fifth idling gear 12c, the second idling gear 13c, and the first idling gear 11b are pivotally supported to be relatively rotatable with respect to the second sub-shaft 7. The first fixed gear 14a is formed with an outer diameter smaller than the outer diameter of the first idling gear 11b. The first fixed gear 14a is fixed to integrally rotate with the second sub-shaft 7. A reversing gear 13d is fixed to the third sub-shaft 8 to integrally rotate with the third sub-shaft 8.

With such a gear arrangement, the second fixed gear 10a and the third fixed gear 10b, the fourth fixed gear 11a and the first idling gear 11b, the third idling gear 12a, the fourth idling gear 12b, and the fifth idling gear 12c, the fifth fixed gear 13a and the second idling gear 13c, the fifth fixed gear 13a and the reversing gear 13d, and the sixth idling gear 13b and the reversing gear 13d are disposed to respectively always mesh with each other.

In the gearbox unit 1, a first synchronizing sleeve (a first synchronization mechanism) 21, a second synchronizing sleeve (a second synchronization mechanism) 22, a third synchronizing sleeve (a third synchronization mechanism) 23, and a fourth synchronizing sleeve (a fourth synchronization mechanism) 24 are provided. The respective synchronizing sleeves 21, 22, 23, and 24 are slid along the axes of main shafts or subs-shafts, which respectively pivotally supports the synchronizing sleeves 21, 22, 23, and 24, by a not-shown shift fork.

Among the synchronizing sleeves, the first synchronizing sleeve 21 is set between the first idling gear 11b and the second idling gear 13c to be slidable along the axis of the second sub-shaft 7 and is slid by the shift fork. The second synchronizing sleeve 22 is set between the third idling gear 12a and the fifth fixed gear 13a to be slidable along the axis of the second main shaft 5 and is slid by the not-shown shift fork. The third synchronizing sleeve 23 is set between the fourth idling gear 12b and the sixth idling gear 13b to be slidable along the axis of the first sub-shaft 6 and is slid by the shift fork. The fourth synchronizing sleeve 24 is set between the fifth idling gear 12c and the second idling gear 13c to be slidable along the axis of the second sub-shaft 7 and is slid respectively by the shift fork.

The first synchronizing sleeve 21 is disposed to overlap the bearing 8a of the third sub-shaft 8 when viewed from a direction perpendicular to the axial direction of the second main shaft 5. That is, the first synchronizing sleeve 21 is arranged to lie on the bearing 8a when viewed from the direction perpendicular to the axial direction of the second main shaft 5.

The second synchronizing sleeve 22, the third synchronizing sleeve 23, and the fourth synchronizing sleeve 24 are arranged on the same plane perpendicular to the axial direction of the respective shafts. That is, the second synchronizing sleeve 22, the third synchronizing sleeve 23, and the fourth synchronizing sleeve 24 are arranged to overlap one another when viewed from the direction perpendicular to the axial direction of the respective shafts and arranged to lie one on top of another when viewed from the direction perpendicular to the axial direction of the respective shafts. The second synchronizing sleeve 22, the third synchronizing sleeve 23, and the fourth synchronizing sleeve 24 are disposed to overlap the bearing 8b of the third sub-shaft 8 in the axial direction of the second main shaft 5. That is, the second synchronizing sleeve 22, the third synchronizing sleeve 23, and the fourth synchronizing sleeve 24 are arranged to lie on the bearing 8b of the third sub-shaft 8 when viewed from the direction perpendicular to the axial direction of the second main shaft 5.

By sliding each of the synchronizing sleeves 21, 22, 23, and 24, it is possible to selectively disconnect and connect (shift), with the first synchronizing sleeve 21, each of the first idling gear 11b and the second idling gear 13c from and to the second sub-shaft 7. It is possible to disconnect and connect (shift), with the second synchronizing sleeve 22, the third idling gear 12a from and to the second main shaft 5. It is possible to selectively disconnect and connect (shift), with the third synchronizing sleeve 23, each of the fourth idling gear 12b and the sixth idling gear 13b from and to the first sub-shaft 6. Further, it is possible to disconnect and connect (shift), with the fourth synchronizing sleeve 24, the fifth idling gear 12c from and to the second sub-shaft 7.

That is, the gearbox unit 1 of a dual-clutch type transmission is configured to be capable of selectively switching the gear positions to the reverse, the first gear, the second gear, the third gear, the fourth gear, the fifth gear, and the sixth gear by sliding each of the synchronizing sleeves 21, 22, 23, and 24 and disconnecting and connecting the clutches 2 and 3.

Next, gearbox operation of the dual-clutch type transmission applied with the transmission of the present invention is explained with reference to FIG. 3 and FIGS. 4A to 4G.

Figures 3, 4A:
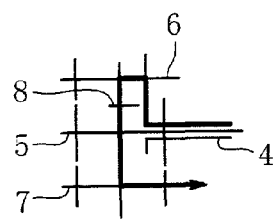
FIG. 3 is a diagram showing the actuations of clutches and synchronizing sleeves in respective gear positions of the transmission according to the present invention.
FIG. 4A is a diagram showing transmission order of a driving force in a reverse of the transmission according to the present invention.
Figure 4B:
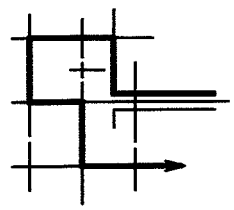
FIG. 4B is a diagram showing transmission order of the driving force in a first gear of the transmission according to the present invention.
Figure 4C:
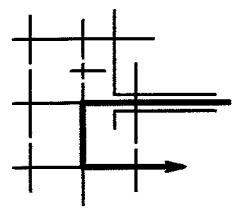
FIG. 4C is a diagram showing transmission order of the driving force in a second gear of the transmission according to the present invention.
Figure 4D:
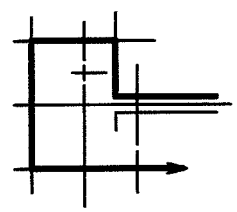
FIG. 4D is a diagram showing transmission order of the driving force in a third gear of the transmission according to the present invention.
Figure 4E:
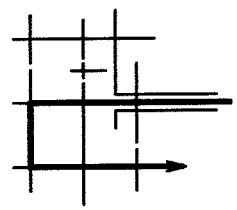
FIG. 4E is a diagram showing transmission order of the driving force in a fourth gear of the transmission according to the present invention.
Figure 4F:
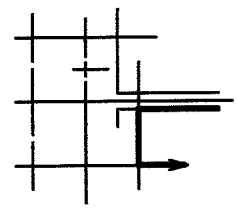
FIG. 4F is a diagram showing transmission order of the driving force in a fifth gear of the transmission according to the present invention.
Figure 4G:
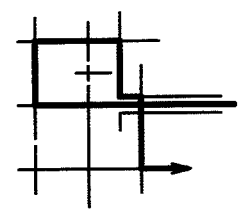
FIG. 4G is a diagram showing transmission order of the driving force in a sixth gear of the transmission according to the present invention.

FIG. 3 is a diagram showing the actuations of the clutches and the synchronizing sleeves in the respective gear positions. FIG. 4A is a diagram showing transmission order of a driving force in the reverse. FIG. 4B is a diagram showing transmission order of the driving force in the first gear. FIG. 4C is a diagram showing transmission order of the driving force in the second gear. FIG. 4D is a diagram showing transmission order of the driving force in the third gear. FIG. 4E is a diagram showing transmission order of the driving force in the fourth gear. FIG. 4F is a diagram showing transmission order of the driving force in the fifth gear. FIG. 4G is a diagram showing transmission order of the driving force in the sixth gear. In FIG. 3, black circles indicate the actuation of the synchronizing sleeves, white void downward triangles indicate the actuation of the synchronizing sleeves only during shift-up, and white void upward triangles indicate the actuation of the synchronizing sleeves only during shift-down. In FIG. 3, K1 indicates disconnection and connection of the first clutch 2 and K2 indicates disconnection and connection of the second clutch 3. In FIG. 3, A indicates disconnection and connection of the fifth idling gear 12c and the second sub-shaft 7 by the actuation of the fourth synchronizing sleeve 24, B indicates disconnection and connection of the second idling gear 13c and the second sub-shaft 7 by the actuation of the first synchronizing sleeve 21, C indicates disconnection and connection of the first idling gear 11b and the second sub-shaft 7 by the actuation of the first synchronizing sleeve 21, D indicates disconnection and connection of the third idling gear 12a and the second main shaft 5 by the actuation of the second synchronizing sleeve 22, E indicates disconnection and connection of the fourth idling gear 12b and the first sub-shaft 6 by the actuation of the third synchronizing sleeve 23, and F indicates disconnection and connection of the sixth idling gear 13b and the first sub-shaft 6 by the actuation of the third synchronizing sleeve 23. Thick solid lines in FIGS. 4A to 4G indicate transmission routes of the driving force.

In the reverse in FIG. 4A, as shown in FIG. 3, the first clutch 2 is connected (K1), the first synchronizing sleeve 21 is actuated to connect the second idling gear 13c and the second sub-shaft 7 (B), the second synchronizing sleeve 22 is actuated to connect the third idling gear 12a and the second main shaft 5 (D), and the third synchronizing sleeve 23 is actuated to connect the sixth idling gear 13b and the first sub-shaft 6 (F). Consequently, as an output of the engine 100, a driving force in a rotating direction reversed with respect to an advancing direction is output from the first fixed gear 14a via the first main shaft 4, the second fixed gear 10a, the third fixed gear 10b, the first sub-shaft 6, the sixth idling gear 13b, the reversing gear 13d, the fifth fixed gear 13a, the second idling gear 13c, and the second sub-shaft 7.

In the first gear in FIG. 4B, as shown in FIG. 3, the first clutch 2 is connected (K1), the first synchronizing sleeve 21 is actuated to connect the second idling gear 13c and the second sub-shaft 7 (B), the second synchronizing sleeve 22 is actuated to connect the third idling gear 12a and the second main shaft 5 (D), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the first main shaft 4, the second fixed gear 10a, the third fixed gear 10b, the first sub-shaft 6, the fourth idling gear 12b, the third idling gear 12a; the second main shaft 5, the fifth fixed gear 13a, the second idling gear 13c, and the second sub-shaft 7. Note that, when shift operation is shift-up, the shift-up can be performed by only disconnecting and connecting operation of the first clutch 2 and the second clutch 3.

In the second gear in FIG. 4C, as shown in FIG. 3, the second clutch 3 is connected (K2), the first synchronizing sleeve 21 is actuated to connect the second idling gear 13c and the second sub-shaft 7 (B), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the second main shaft 5, the fifth fixed gear 13a, the second idling gear 13c, and the second sub-shaft 7. Note that, when the shift operation is the shift-up, the fourth synchronizing sleeve 24 is actuated to connect the fifth idling gear 12c and the second sub-shaft 7 in advance (A) and, when the shift operation is shift-down, the second synchronizing sleeve 22 is actuated to connect the third idling gear 12a and the second main shaft 5 in advance (D). Consequently, it is possible to perform pre-shift for enabling the shift-up or the shift-down only with the disconnection and connection operation of the first clutch 2 and the second clutch 3.

In the third gear in FIG. 4D, as shown in FIG. 3, the first clutch 2 is connected (K1), the fourth synchronizing sleeve 24 is actuated to connect the fifth idling gear 12c and the second sub-shaft 7 (A), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the first main shaft 4, the second fixed gear 10a, the third fixed gear 10b, the first sub-shaft 6, the fourth idling gear 12b, the third idling gear 12a, the fifth idling gear 12c, and the second sub-shaft 7. Note that, when the shift operation is the shift-up, the second synchronizing sleeve 22 is actuated to connect the third idling gear 12a and the second main shaft 5 in advance (D) or, when the shift operation is the shift-down, the first synchronizing sleeve 21 is actuated to connect the second idling gear 13c and the second sub-shaft 7 in advance (B). Consequently, it is possible to perform the pre-shift for enabling the shift-up or the shift-down only with the disconnection and connection operation of the first clutch 2 and the second clutch 3.

In the fourth gear in FIG. 4E, as shown in FIG. 3, the second clutch 3 is connected (K2), the fourth synchronizing sleeve 24 is actuated to connect the fifth idling gear 12c and the second sub-shaft 7 (A), and the second synchronizing sleeve 22 is actuated to connect the third idling gear 12a and the second main shaft 5 (D). Consequently, as the output of the engine 100, a driving force in the advancing rotating direction is output from the first fixed gear 14a via the second main shaft 5, the third idling gear 12a, the fifth idling gear 12c, and the second sub-shaft 7. Note that, when the shift operation is the shift-up, the first synchronizing sleeve 21 is actuated to connect the first idling gear 11b and the second sub-shaft 7 in advance (C) or, when the shift operation is the shift-down, the third synchronizing sleeve 23 is actuated to connect the fourth idling gear 12b and the first sub-shaft 6 in advance (E). Consequently, it is possible to perform the pre-shift for enabling the shift-up or the shift-down only with the disconnection and connection operation of the first clutch 2 and the second clutch 3.

In the fifth gear in FIG. 4F, as shown in FIG. 3, the first clutch 2 is connected (K1), the first synchronizing sleeve 21 is actuated to connect the first idling gear 11b and the second sub-shaft 7 (C), and the second synchronizing sleeve 22 is actuated to connect the third idling gear 12a and the second main shaft 5 (D). Consequently, as the output of the engine 100, a driving force in the advancing rotating direction is output from the first fixed gear 14a via the first main shaft 4, the fourth fixed gear 11a, the first idling gear 11b, and the second sub-shaft 7. Note that, when the shift operation is the shift-up, the third synchronizing sleeve 23 is actuated to connect the fourth idling gear 12b and the first sub-shaft 6 in advance (E) or, when the shift operation is the shift-down, the fourth synchronizing sleeve is actuated to connect the fifth idling gear 12c and the second sub-shaft 7 in advance (A). Consequently, it is possible to perform the pre-shift for enabling the shift-up or the shift-down only with the disconnection and connection operation of the first clutch 2 and the second clutch 3.

In the sixth gear in FIG. 4G, as shown in FIG. 3, the second clutch 3 is connected (K2), the first synchronizing sleeve 21 is actuated to connect the first idling gear 11b and the second sub-shaft 7 (C), the second synchronizing sleeve 22 is actuated to connect the third idling gear 12a and the second main shaft 5 (D), and the third synchronizing sleeve 23 is actuated to connect the fourth idling gear 12b and the first sub-shaft 6 (E). Consequently, as the output of the engine 100, a driving force in the advancing rotating direction is output from the first fixed gear 14a via the second main shaft 5, the third idling gear 12a, the fourth idling gear 12b, the first sub-shaft 6, the third fixed gear 10b, the second fixed gear 10a, the first main shaft 4, the fourth fixed gear 11a, the first idling gear 11b, and the second sub-shaft 7. Note that, when the shift operation is the shift-down, it is possible to perform the shift-down only with the disconnection and connection operation of the first clutch 2 and the second clutch 3.

In this way, in the transmission according to the present invention, the reversing gear 13d is disposed between the fifth fixed gear 13a having the smallest outer diameter among the respective gears provided in the first main shaft 4 and the second main shaft 5 and the sixth idling gear 13b having the smallest outer diameter among the respective gears provided in the first sub-shaft 6 to always mesh with the respective gears. Even if the outer diameter of the reversing gear 13d is relatively large, it is possible to suppress the gearbox unit 1 from expanding in the radial direction of the second main shaft 5 by setting the reversing gear 13d. Therefore, it is possible to make the gearbox unit 1 compact and improve the vehicle mountability.

The first synchronizing sleeve 21 is disposed to overlap the bearing 8a of the third sub-shaft 8 in the axial direction of the second main shaft 5. Therefore, it is possible to reduce the length in the axial direction of the gearbox unit 1 and improve the vehicle mountability.

The second synchronizing sleeve 22, the third synchronizing sleeve 23, and the fourth synchronizing sleeve 24 are disposed to overlap the bearing 8b of the third sub-shaft 8 in the axial direction of the second main shaft 5. Therefore, it is possible to further reduce the length in the axial direction of the gearbox unit 1 and further improve the vehicle mountability.

The embodiments of the present invention are explained above. However, forms of the present invention are not limited to the embodiments.

In the embodiments, the number of gear positions is set to the forward six gear positions. However, the number of gear positions is not limited to this. The present invention can be applied irrespective of whether the number of gear positions is smaller than the forward six gear positions or larger than the forward six positions.

In the embodiment, the combination of the outer diameters of the respective gears is described. However, the outer diameters of the gears are not limited to this combination. The outer diameters of the gears are determined according to a set gear ratio. The reversing gear 13d only has to be disposed between the gear having the smallest outer diameter among the gears provided in the first main shaft 4 and the second main shaft 5 and the gear having the smallest outer diameter among the gears provided in the first sub-shaft 6.

REFERENCE SIGNS LIST

1 Gearbox unit
2 First clutch
3 Second clutch
4 First main shaft
5 Second main shaft
6 First sub-shaft
7 Second sub-shaft
8 Third sub-shaft
8a, 8b Bearing
9 Output shaft (main input shaft)
11b First idling gear
12a Third idling gear
12b Fourth idling gear
12c Fifth idling gear
13c Second idling gear
13d Reversing gear
14a First fixed gear
21 First synchronizing sleeve (first synchronization mechanism)
22 Second synchronizing sleeve (second synchronization mechanism)
23 Third synchronizing sleeve (third synchronization mechanism)
24 Fourth synchronizing sleeve (fourth synchronization mechanism)
100 Engine (internal combustion engine)

The invention claimed is:

1. A transmission comprising: a main input shaft to which a driving force from an internal combustion engine is input; a first main shaft to which the driving force of the main input shaft is selectively transmitted via a first clutch; a second main shaft arranged coaxially with the first main shaft, the driving force of the main input shaft being selectively transmitted to the second main shaft via a second clutch; a first sub-shaft, a second sub-shaft, and a third sub-shaft arranged in parallel to the first main shaft and the second main shaft; gear groups respectively provided in the first main shaft and the second main shaft; a gear group provided in the first sub-shaft; and a first fixed gear provided in the second sub-shaft and configured to output the driving force,
the transmission comprising a reversing gear fixedly provided in the third sub-shaft;
a first idling gear relatively rotatably supported by the second sub-shaft and configured to transmit the driving force of the first main shaft;
a second idling gear relatively rotatably supported by the second sub-shaft and configured to transmit the driving force of the second main shaft; and
a first synchronization mechanism provided in the second sub-shaft and configured to selectively transmit the driving force of the first idling gear or the driving force of the second idling gear to the second sub-shaft, wherein
the reversing gear is arranged between a gear having a smallest outer diameter in the gear groups provided in the first main shaft and the second main shaft and a gear having a smallest outer diameter in the gear group provided in the first sub-shaft to mesh with the respective gears,
both ends of the third sub-shaft are rotatably supported by bearings, and
one bearing of the third sub-shaft is disposed to overlap the first synchronization mechanism in an axial direction of the second main shaft.

2. The transmission according to claim 1 comprising:
a second synchronization mechanism configured to connect a third idling gear and the second main shaft, the third idling gear being relatively rotatably supported by the second main shaft and configured to transmit the driving force to the first sub-shaft and the second sub-shaft;
a third synchronization mechanism configured to connect a fourth idling gear and the first sub-shaft, the fourth idling gear being relatively rotatably supported by the first sub-shaft; and
a fourth synchronization mechanism configured to connect a fifth idling gear and the second sub-shaft, the fifth idling gear being relatively rotatably supported by the second sub-shaft, wherein
the other bearing of the third sub-shaft is disposed to overlap the second synchronization mechanism, the third synchronization mechanism, and the fourth synchronization mechanism in the axial direction of the second main shaft.

3. A transmission comprising: a main input shaft to which a driving force from an internal combustion engine is input; a first main shaft to which the driving force of the main input shaft is selectively transmitted via a first clutch; a second main shaft arranged coaxially with the first main shaft, the driving force of the main input shaft being selectively transmitted to the second main shaft via a second clutch; a first sub-shaft, a second sub-shaft, and a third sub-shaft arranged in parallel to the first main shaft and the second main shaft; gear groups respectively provided in the first main shaft and the second main shaft; a gear group provided in the first sub-shaft; and a first fixed gear provided in the second sub-shaft and configured to output the driving force,
the transmission comprising a reversing gear fixedly provided in the third sub-shaft;
a second synchronization mechanism configured to connect a third idling gear and the second main shaft, the third idling gear being relatively rotatably supported by the second main shaft and configured to transmit the driving force to the first sub-shaft and the second sub-shaft;

a third synchronization mechanism configured to connect a fourth idling gear and the first sub-shaft, the fourth idling gear being relatively rotatably supported by the first sub-shaft; and a fourth synchronization mechanism configured to connect a fifth idling gear and the second sub-shaft, the fifth idling gear being relatively rotatably supported by the second sub-shaft, wherein the reversing gear is arranged between a gear having a smallest outer diameter in the gear groups provided in the first main shaft and the second main shaft and a gear having a smallest outer diameter in the gear group provided in the first sub-shaft to mesh with the respective gears, both ends of the third sub-shaft are rotatably supported by bearings, and the other bearing of the third sub-shaft opposed to one bearing of the third sub-shaft is disposed to overlap the second synchronization mechanism, the third synchronization mechanism, and the fourth synchronization mechanism in the axial direction of the second main shaft.

* * * * *